(12) United States Patent
Wevers et al.

(10) Patent No.: US 7,858,688 B2
(45) Date of Patent: Dec. 28, 2010

(54) THERMOPLASTIC ARTICLES AND PROCESSES FOR MAKING THE SAME USING AN IMPROVED MASTERBATCH

(75) Inventors: Ronald Wevers, Terneuzen (NL); Franciscus J. T. Krabbenborg, Terneuzen (NL); Michael Ballot, Dottenijs (BE); Jacobus Houg, Zaamslag (NL)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 12/757,469

(22) Filed: Apr. 9, 2010

(65) Prior Publication Data

US 2010/0216931 A1    Aug. 26, 2010

Related U.S. Application Data

(60) Division of application No. 11/821,706, filed on Jun. 25, 2007, now Pat. No. 7,732,521, which is a continuation of application No. PCT/US2007/071902, filed on Jun. 22, 2007.

(60) Provisional application No. 60/806,179, filed on Jun. 29, 2006.

(51) Int. Cl.
  *C08J 3/22*    (2006.01)
  *H05B 7/00*    (2006.01)

(52) U.S. Cl. ...................................... 524/451; 264/452

(58) Field of Classification Search ................. 524/451; 264/452
  See application file for complete search history.

(56) References Cited

U.S. PATENT DOCUMENTS

| 3,654,219 A | 4/1972 | Boyer et al. |
| 3,682,443 A | 8/1972 | Upmeier |
| 4,251,646 A | 2/1981 | Smith, Jr. |
| 4,663,103 A | 5/1987 | McCullough et al. |
| 4,732,926 A | 3/1988 | Faulkner |
| 5,130,076 A | 7/1992 | Blatz et al. |
| 5,215,764 A | 6/1993 | Davis et al. |

(Continued)

FOREIGN PATENT DOCUMENTS

EP    0444671 A    9/1991

(Continued)

OTHER PUBLICATIONS

Verbraak, C., et al, "Screw Design in Injection Molding," Polym. Eng. & Sci., vol. 29, Nov. 7, 1989, pp. 479-487.

(Continued)

*Primary Examiner*—William K Cheung
(74) *Attorney, Agent, or Firm*—Dobrusin & Thennisch PC

(57) ABSTRACT

The present invention is directed to improved processes for making plastic articles, and articles made therefrom. In a broad aspect, the invention is directed to improved processes and articles made therefrom, that include the steps of providing as separate materials a first material that includes a polyolefin, a second material including an admixture of from about 45 to 85 wt. % of the total admixture of at least one particulated mineral filler; and from about 15 to 55 wt. % of the total admixture of at least a second polyolefin having a melt index greater than about 150 g/10 min at 190° C./2.16 kg, as measured per ISO 1133 (condition D); applying a shear force to form a molten blend; shaping the molten blend and solidifying the molten blend.

20 Claims, 1 Drawing Sheet

U.S. PATENT DOCUMENTS

| | | |
|---|---|---|
| 5,298,587 A | 3/1994 | Hu et al. |
| 5,320,875 A | 6/1994 | Hu et al. |
| 5,433,786 A | 7/1995 | Hu et al. |
| 5,494,712 A | 2/1996 | Hu et al. |
| 5,837,958 A | 11/1998 | Fornsel |
| 6,187,424 B1 | 2/2001 | Kjellqvist et al. |
| 6,254,956 B1 | 7/2001 | Kjellqvist et al. |
| 6,262,161 B1 | 7/2001 | Betso et al. |
| 6,297,301 B1 | 10/2001 | Erderly et al. |
| 6,329,454 B1 | 12/2001 | Krabbenborg |
| 6,403,691 B1 | 6/2002 | Zanka et al. |
| 6,407,191 B1 | 6/2002 | Mezquita et al. |
| 6,441,081 B1 | 8/2002 | Sadatoshi et al. |
| 6,525,157 B2 | 2/2003 | Cozewith et al. |
| 6,544,450 B2 | 4/2003 | Welsh et al. |
| 6,710,145 B2 | 3/2004 | Sonnenschein et al. |
| 6,713,578 B2 | 3/2004 | Sonnenschein et al. |
| 6,713,579 B2 | 3/2004 | Sonnenschein et al. |
| 6,730,759 B2 | 5/2004 | Sonnenschein et al. |
| 6,734,253 B2 | 5/2004 | Krabbenborg et al. |
| 6,806,330 B1 | 10/2004 | Sonnenschein et al. |
| 6,949,603 B2 | 9/2005 | Sonnenschein et al. |
| 7,271,202 B2 | 9/2007 | Krabbenborg et al. |
| 2002/0061976 A1 | 5/2002 | Krabbenborg et al. |
| 2002/0121716 A1 | 9/2002 | Welsh et al. |
| 2003/0204017 A1 | 10/2003 | James et al. |
| 2003/0212159 A1 | 11/2003 | Martinez et al. |
| 2004/0048967 A1 | 3/2004 | Tomomatsu et al. |
| 2004/0171758 A1 | 9/2004 | Ellul et al. |
| 2005/0004332 A1 | 1/2005 | Jialanella et al. |
| 2005/0046367 A1 | 3/2005 | Wevers et al. |
| 2005/0049346 A1 | 3/2005 | Blanchard et al. |
| 2005/0070673 A1 | 3/2005 | Novak et al. |
| 2005/0087906 A1 | 4/2005 | Caretta et al. |
| 2005/0100754 A1 | 5/2005 | Moncla et al. |
| 2005/0116390 A1 | 6/2005 | Watson et al. |
| 2005/0137370 A1 | 6/2005 | Jialanella et al. |
| 2005/0156352 A1 | 7/2005 | Burkle et al. |
| 2005/0215737 A1* | 9/2005 | Dharmarajan et al. ....... 526/170 |
| 2005/0250890 A1 | 11/2005 | Chen et al. |
| 2007/0141323 A1 | 6/2007 | Wevers et al. |
| 2007/0141933 A1 | 6/2007 | Wevers et al. |
| 2007/0246862 A1 | 10/2007 | Jones |
| 2008/0009586 A1 | 1/2008 | VanSumeren et al. |
| 2008/0045645 A1 | 2/2008 | Seliskar et al. |
| 2008/0169055 A1 | 7/2008 | Seliskar et al. |
| 2009/0105397 A1 | 4/2009 | van Riel et al. |
| 2009/0105404 A1 | 4/2009 | van Riel et al. |

FOREIGN PATENT DOCUMENTS

| | | |
|---|---|---|
| EP | 0987091 | 9/1999 |
| EP | 1741744 A2 | 1/2007 |
| JP | 60-031514 A | 2/1985 |
| JP | 09124857 A | 5/1997 |
| JP | 2004/168879 | 6/2004 |
| WO | 98/46672 A2 | 10/1998 |
| WO | 99/07785 A1 | 2/1999 |
| WO | 00/34027 A | 6/2000 |
| WO | 01/12708 A1 | 2/2001 |
| WO | 01/42344 A1 | 6/2001 |
| WO | 01/57120 A2 | 8/2001 |
| WO | 01/58988 A | 8/2001 |
| WO | 02/22731 A2 | 3/2002 |
| WO | 02/43943 A | 6/2002 |
| WO | 03/040201 | 5/2003 |
| WO | 2004/009657 A1 | 1/2004 |
| WO | 2004/031292 A1 | 4/2004 |
| WO | 2005/105868 A | 11/2005 |
| WO | 2006/047376 A1 | 5/2006 |
| WO | 2007/024541 A2 | 3/2007 |
| WO | 2007/078536 A1 | 7/2007 |
| WO | 2007/078537 A1 | 7/2007 |
| WO | 2008/002841 A2 | 1/2008 |
| WO | 2008/002841 A3 | 1/2008 |

OTHER PUBLICATIONS

Han, C.D., et al., "Morphology and Mechanical Properties of Injection Molded Specimens of Two-Phase Polymer Blends," Journal of Applied Polymer Science, vol. 21, 1977, pp. 353-370.

"EXACT Plastomers—High performance Solutions for TPO Applications," ExxonMobil Technical Bulletin, May 2005.

International Search Report WO2008/002841, Dec. 18, 2007.

Copending U.S. Appl. No. 61/036,692, filed Mar. 14, 2008.

Copending U.S. Appl. No. 60/981,658, filed Oct. 22, 2007.

* cited by examiner

THERMOPLASTIC ARTICLES AND PROCESSES FOR MAKING THE SAME USING AN IMPROVED MASTERBATCH

CLAIM OF BENEFIT OF FILING DATE

This patent application is a division of U.S. patent application Ser. No. 11/821,706, filed on Jun. 25, 2007 now U.S. Pat. No. 7,732,521. U.S. patent application Ser. No. 11/821,706 is a non-provisional patent application, which claims the benefit of the filing date of U.S. Provisional Patent Application No. 60/806,179, filed Jun. 29, 2006, and is a continuation of International Patent Application No. PCT/US07/71902 filed Jun. 22, 2007. U.S. patent application Ser. No. 11/821,706, filed on Jun. 25, 2007; U.S. Provisional Patent Application No. 60/806,179, filed on Jun. 29, 2006; and International Patent Application No. PCT/US07/7192, filed on Jun. 22, 2007; are each incorporated herein in their entirety by reference.

FIELD OF THE INVENTION

The present invention relates to shaped thermoplastic articles and processes for making the same, and in one particular aspect, to injection molded polyolefin articles that are blended while in an injection molding machine using an improved masterbatch material.

BACKGROUND OF THE INVENTION

In the field of plastics there continues to be a need for materials that have good mechanical properties, and which are relatively inexpensive and efficient to make. With the recent upsurge in raw material prices and the cost of energy for processing the materials, the search has intensified for attractive alternative materials systems that satisfy the physical and mechanical needs met by many current commercial plastics. In the field of thermoplastic polyolefins, for example, it would be attractive to have an effective material system that reduces the dependency upon pre-fabricating compounding steps, particularly those that subject the starting materials to heat history, that require energy consumption for processing, or both.

Examples from the literature addressing the preparation of materials in this field include Published U.S. Application Nos. US20040048967A1, 20050070673A1, 20050250890A1, 20050049346A1; U.S. Pat. Nos. 4,732,926; 5,130,076; 6,403,691; and 6,441,081; EP Patent Application No. 0987091A1; JP Patent Application 2004168876; WO2004/031292A2; Verbraak, C., et al, "Screw Design in Injection Molding," Polym. Eng. & Sci., Vol. 29, No. 7, 1989, pp 479-487; Han, C. D., et al, "Morphology and Mechanical Properties of Injection Molded Specimens of Two-Phase Polymer Blends," Journal of Applied Polymer Science, Vol. 21, 1977, pp 353-370; and "EXACT Plastomers—High Performance Solutions for TPO Applications," ExxonMobil Technical Bulletin, May, 2005, all of which are hereby expressly incorporated by reference.

SUMMARY OF THE INVENTION

The present invention is directed to improved processes for making plastic articles, and articles made therefrom. In a broad aspect, the invention is directed to improved processes, and articles made therefrom, that include the steps of providing as separate materials a first material that includes or consists essentially of a polyolefin (e.g., a thermoplastic polyolefin) and a second material including an admixture of a particulated filler and a second polyolefin; applying a shear force to the first and second materials, while the materials are at an elevated temperature for blending the materials to form a molten blend; shaping the molten blend and solidifying the molten blend.

In a more specific aspect, the process employs as the second material a masterbatch admixture of from about 45 to 85 wt. % of the total admixture of at least one particulated mineral filler; and from about 15 to 55 wt. % of the total admixture of at least a second polyolefin having a melt index greater than about 150 g/10 min at 190° C./2.16 kg, as measured per ISO 1133 (condition D). Further the process is substantially free of a step of compounding together the first and second materials prior to the blending step.

DETAILED DESCRIPTION OF THE INVENTION

Figure 1A:
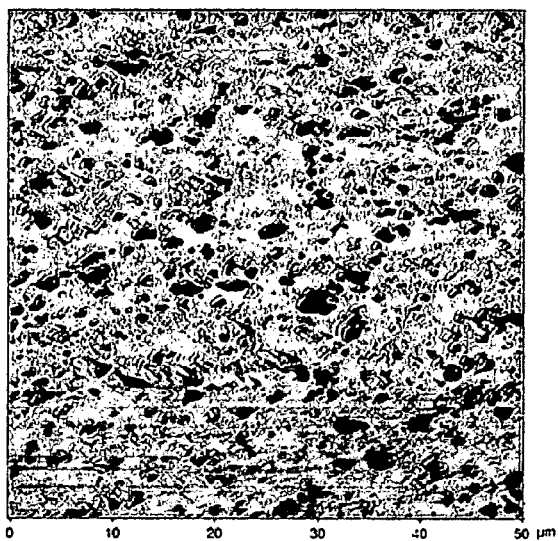
FIGS. 1a and 1b are illustrative micrograph to show a microstructure that may be obtainable in accordance with the teachings.

The present invention is directed to improved processes for making plastic articles, and articles made therefrom. In a broad aspect, the invention is directed to improved processes and articles made therefrom, which include the steps of providing as separate materials a first polyolefin (e.g., a thermoplastic polyolefin, a polypropylene copolymer, or polypropylene homopolymer, any combination thereof, or otherwise), a second material including a masterbatch admixture of a particulated filler and a second polyolefin (e.g., an admixture of from about 45 to 85 wt. % of the total admixture of at least one particulated mineral filler, and from about 15 to 55 wt. % of the total admixture of at least a second polyolefin having a melt index greater than about 150 g/10 min at 190° C./2.16 kg, as measured per ISO 1133 (condition D)); applying a shear force to the materials, while the materials are at an elevated temperature for blending the materials to form a molten blend; shaping the molten blend and solidifying the molten blend. Desirably, the process is free of a step of compounding together the first and second materials prior to the blending step, and specifically is free of a prior compounding step that includes a melt blending step.

From the above, it can be seen that the step of shaping the molten blend can be performed using any one or combination of a number of art-disclosed techniques for making shaped articles. By way of example, the shaping can be done by blow molding, injection molding, or any combination thereof. In general, such step advantageously employs a suitable apparatus for imparting a shear force to the feedstock, particularly at an elevated temperature, so that a molten blend is obtained. By way of example, a typical approach employs an apparatus having a screw and barrel assembly, into which the feedstock (e.g., pellets of each of the first and second materials herein) is fed, such as by introduction directly from a storage container(s) and via a mixing hopper. As material advances along a screw within the screw and barrel assembly, it will be mixed by dispersive mixing, by distributive mixing or both. A mixing arm may be employed for dry mixing pellets of the first and second materials. Suitable feeders may be used such as a gravimetric feeder, with or without weigh scale blender (e.g., available from Maguire).

The pellets of the first and the second materials are sized generally similar to each other. For example, it is desirable that at least 50% (and more specifically at least about 65%) by weight of the pellets of both the first material and the pellets of the second material are substantially the same size (i.e., their respective longest dimensions are within about 15% variation of each other).

In one embodiment of the invention, the pellets of the first material is generally sized smaller than the pellets of the second material such that the average volume of the individual pellets of the first material is smaller than the average volume of the individual pellets of the second material. The average volume can be determined by measuring the mass of 100 randomly selected pellets and dividing the mass by the quantity of 100 times the density of the material, where the unit for volume is $cm^3$, the unit for mass is grams, and the unit for density is grams/$cm^3$.

As desired, the material may be subjected to a mixing flight that includes at least one undercut for providing dispersive mixing, at least one bypass channel for providing distributive mixing or both. After forming a desired blend, the blended material is expelled from the apparatus, such as through an optional mixing nozzle, and brought into contact with a tool wall for defining the shape of the desired article.

Examples of processing conditions useful in accordance with the present invention are disclosed, without limitation, in U.S. Provisional Patent Application Ser. No. 60/745,116, hereby incorporated by reference. By way of illustration, and without intending to be limited thereby, a screw and barrel assembly as used herein may be of any suitable dimensions for accomplishing the desired results. In one approach, wherein the blending step occurs within the screw and barrel assembly, the screw and barrel assembly has a length to diameter ratio greater than about 5:1, more specifically greater than about 10:1 and still more specifically greater than about 15:1 (e.g., about 15:1 to 25:1).

Another consideration that may be employed during blending within a screw and barrel assembly, according to the teachings herein, is the selection of an appropriate back pressure (namely the pressure applied to the plastic during screw recovery), the screw compression ratio, or both. By way of example, in one illustrative aspect, a back pressure of at least about 6 bar, and more specifically at least about 10 bar, or even at least about 25 bar (e.g., about 70 bar) is applied to the first, second and third materials during the blending step, a screw compression ratio of greater than about 1:1 (and more specifically at least about 2:1, such as about 2:1 to 3.5:1 or higher (e.g., about 2.4:1)) is employed, or a combination of both. Higher and lower values are also possible.

It may be desirable to employ a screw speed of about 20 to 400 rpm, more specifically about 50 to about 250 rpm, and still more specifically about 100 to about 200 rpm (e.g. about 160 rpm), during the blending step.

The blending step may occur at any suitable melt set point temperature for the particular machine employed. For example, it may occur at a melt set point temperature for the machine of about 160 to about 300° C., and more specifically at about 210 to about 255° C., and still more specifically at about 220 to about 240° C.

Optionally, the injecting step includes passing the blend through a static mixer, such as a mixing nozzle (e.g., an interfacial surface generating mixing nozzle).

A variety of art-disclosed screw designs may be employed to achieve good mixing, with high performance designs being particularly attractive. One feature of high performance designs is the presence of two or more channels with varying channel dimensions along the length of the screw. This variation in channel dimension forces material to flow between channels, resulting in improved mixing. For example, distributive mixing may be accomplished by cutting and folding a polymer melt stream whereas dispersive mixing may be accomplished by forcing a polymer melt stream through a restrictive channel. Some examples of high performance screws consist of but are not limited to Energy Transfer (ET) screws, double wave screws, Stratablend™ screws, and Uni-Mix™ screws. Secondary mixing devices may also be employed to improve mixing. These secondary mixing devices may be incorporated into the screw design (dynamic mixer) or they may be incorporated downstream of the screw (static mixer). Some examples of dynamic mixers consist of but are not limited to one or more of a Maddock-style mixers, blister mixers, spiral dam mixers, pin mixers, and mixing rings. Some examples of static mixers consist of but are not limited to Kenics™ mixers, interfacial surface generator (ISG) mixers, and Koch™ mixers. In the case of injection molding, such static mixer designs can be incorporated into the nozzle and they are referred to as mixing nozzles.

As can be seen from the above, though a compounding process that includes melt blending the starting materials may optionally be employed in advance of feeding the materials into the apparatus, a particularly desired approach is to omit such step. Thus, the process is substantially free of a step of compounding together the first and second materials prior to the blending step.

Turning to the first material, generally, it will include a polyolefin, and more particularly a thermoplastic elastomer that includes two or more alpha-olefin comonomers (e.g., propylene, 1-butene, 1-hexene, 1-octene), or more specifically a thermoplastic polyolefin (that is, a polyolefin alloy that includes a polypropylene and a flexibilizing component, such as an ethylene-propylene copolymer). Desirably, as employed in the processes herein, the first material includes a polypropylene impact copolymer characterized by a melt flow rate of less than about 70 g/10 min (ISO 1133 condition M at 230° C., 2.16 kg) (e.g., about 1 to about 55 g/10 min, more particularly about 3 to about 45 g/10 min, and still more particularly about 4 g/10 min to about 20 g/10 min); containing greater than about 8 wt % (by weight of the first material) of ethylene (e.g., greater than about 12 wt % ethylene); having crystallinity greater than about 30% (e.g., greater than about 50%, has a glass transition temperature of less than about −30 C, and a density less than about 0.92 g/cc, or any combination thereof. The materials used as the first material optionally are substantially free of a butadiene-containing rubber, such as an SBS or SBR rubber. An example of a suitable first material is commercially available from The Dow Chemical Company as a developmental polypropylene resin under the designation of Developmental Polypropylene Resin DC7003.00. Another example of a suitable first material is available from The Dow Chemical Company as D143.00 Developmental TPO, which the manufacturer describes as a high impact reactor TPO grade.

The first polyolefin preferably comprises a thermoplastic polyolefin selected from the group consisting of reactor TPO, controlled rheology TPO, and combinations thereof.

In the final overall material the first material will typically be present in an amount greater than about 20 wt %, more particularly greater than about 35 wt %, and more specifically, about 40 to about 98 wt %, (and even still more specifically about 75 to about 95 wt %) of the final material. A polypropylene homopolymer or a random polypropylene copolymer may be used in place of, or in addition to, the polypropylene impact copolymer. It will be appreciated that the employment of polymers herein desirably may employ the polymers in a neat state. Of course, the teachings also contemplate the possible inclusion in the polymer of suitable art-disclosed additives of a type such as a clarifier/nucleator, a lubricant, a slip agent, a stabilizer (e.g., thermal stabilizer), any combination thereof or the like.

Turning next to the second material, it typically will include the masterbatch admixture of the present teachings, which includes, or (in a more specific aspect) consists essentially of, a particulated filler and a second thermoplastic material, and specifically a second polyolefin. While any of a number of alternative art-disclosed fillers may be employed (e.g., mica, calcium carbonate, silica, clays, wood, titanium dioxide), a preferred filler is talc (e.g., one that consists essentially of $3MgO.4SiO_2.H_2O$). The fillers may have any suitable median particle size, e.g., on the order of about 10 microns or smaller (e.g., about 7 microns or less, or even about 5 micron or less, or possibly even less than about 3 microns (e.g., less than about 1 micron)). The fillers may be any suitable top-size particle size, e.g., on the order of about 50 microns or smaller (e.g., less than about 30 microns, or more specifically less than about 15 microns).

With the second material, it is desirable that the filler be compounded (e.g., by a melt blending step) in advance with the second thermoplastic material. The compounding or melt blending steps for preparing the second material could possibly utilize, without limitation, a single screw extruder, a twin screw extruder, or a kneader. It is desired that the filler be mixed so that it distributes generally uniformly throughout the second material. At that time it is also possible that the second material will be admixed to include one or more additives, as taught elsewhere herein. It is also possible at this stage or subsequently to add a colorant or pigment. In one approach it may also be desirable to add another polymer in addition to the second polyolefin, such as a polyethylene (e.g., LLDPE), a polypropylene homopolymer or some other compatible material for tuning the performance characteristics of the resulting material. Thus, it can be seen that the second material may employ the same type of polymer as the first material, or another polymer or combination of polymers.

Desirably, the viscosity of the second material (viscosity being measured under melt conditions (e.g., at a temperature on the order of about 177° C., per ASTM D1084)) is sufficiently low such that the resulting viscosity of the masterbatch admixture will be below the viscosity of the polyolefin in the first material.

In a particular example in accordance with the present teachings, the second polyolefin is a polyolefin plastomer, and particularly one having a melt index greater than about 150 g/10 min (and more specifically greater than about 250 or even 500 g/10 min) at 190° C./2.16 kg, as measured per ISO 1133 (condition D). Such material desirably exhibits an ultimate elongation (per ASTM D 638) of at least about 80%, and more specifically at least about 100%; and a tensile strength (per ASTM D 638) of at least about 145 psi (1 MPa), and more specifically at least about 200 psi (1.3 MPa). Particular examples of suitable polyolefin plastomers are available from The Dow Chemical Company under the designation AFFINITY GA 1900 and AFFINITY GA 1950.

Plastomers are metallocene-catalyzed ethylene alpha olefin copolymers with densities in the range from 0.910 to 0.860 and properties in the range between linear low-density polyethylene and ethylene-propylene rubber. Plastomers based on butene, hexene and octene as comonomers are available, for example from ExxonMobil and DEXPlastomers.

In a particular example in accordance with the present teachings, the second polyolefin is a propylene-ethylene copolymer, and particularly one having a melt index greater than about 10 g/10 min (and more specifically greater than about 16 or even 20 g/10 min) at 230° C./2.16 kg, as measured per ISO 1133 (condition M). Such material desirably exhibits an elongation at yield (per ASTM D 638) of at least about 35%, and more specifically at least about 55%; and a tensile strength at yield (per ASTM D 638) from about 145 psi (1 MPa) to about 1450 psi (10 MPa), and more specifically from about 200 psi (1.4 MPa) to about 1000 psi (6.9 MPa), and still more specifically from about 290 psi (2 MPa) to 725 psi (5 MPa). Such material desirably exhibits a hardness (per ASTM D-2240) of less than about 85 Shore A, preferably less than about 80 Shore A, and more preferably less than about 75 Shore A; and a flexural modulus (per ASTM D-790A) of less than about 100 MPa, preferably less than about 60 MPa, and more preferably less than about 44 MPa (e.g. from about 20 to 35 MPa). A particular example of a suitable polypropylene-ethylene copolymer is available from The Dow Chemical Company under the designation VERSIFY (e.g. VERSIFY DE4300.01).

In a particular example in accordance with the present teachings, the second polyolefin is compatible with an elastomeric component of the first polyolefin. Accordingly, it is possible that the elastomeric component of the first material will form a single phase with polyolefin of the second material.

As can be appreciated, the second material may be regarded effectively as a masterbatch, or in a particular example, as a "concentrate". Thus, from another perspective the amount of filler (e.g., talc) in the concentrate will commonly be greater than about 40 wt % of the concentrate, such as from about 45 to about 80 wt %, and more specifically, from about 60 to about 75 wt % of the concentrate. For example, the amount of the respective materials is selected so that the filler is present in the final material in an amount less than about 40 wt %, more specifically less than about 30 wt %, and still more specifically less than about 20 wt %. More specifically, the overall filler content (e.g., talc content for a filler consisting essentially of talc), will range from about 2 to about 25 wt % of the final material (e.g., about 5 to about 20 wt % of the final material, or even more specifically about 8 to about 15 wt % of the final material). For example, typical talc contents in the final material may have values such as about 5.5 wt %, about 8 wt %, about 10 wt %, about 12 wt %, about 15 wt %, or even about 18 wt %. Moreover, if one or more additives are desired in the final material, it is possible that such additives (including for example a colorant) will be included within the concentrate.

In one embodiment of the invention, a talc concentration of up to about 20% by weight (e.g. up to about 15% by weight) can be achieved in the final material wherein the talc shows no significant affect on the shrinkage or impact properties of the final material. Such a material would desirably be ductile at low temperatures (e.g. at about −30° C. or at about −40° C.).

In one approach, particles of this second material may be coated or partially coated with a mineral filler or a micronized polymer. Such a coating could reduce the tack between the masterbatch particles.

The polyolefin for use in the first material, the second material or both, may include additional polyolefins, such as propylene-ethylene copolymers (which may be rubber-modified). Examples of a suitable material that includes or consists essentially of a polyolefin are available from The Dow Chemical Company under the designation of C705-44NA or C715-12NHP. Additional specific examples of polymers that may be employed in accordance with the present teachings include those disclosed in WO 03/040201 A1, published US Application No. 2003-0204017, and U.S. Pat. No. 6,525,157, all of which are incorporated by reference. Polymers made with a metallocene catalyst are also possible for use in the first material, the second material or both. Such polymers likewise may be included as a third or other material, in addition to the first and second materials. The propylene-ethylene copolymers may include from a lower limit of 5% or 6% or 8% or 10% by weight to an upper limit of 20% or 25% by weight ethylene-derived units, and from a lower limit of 75% or 80% by weight to an upper limit of 95% or 94% or 92% or 90% by weight propylene-derived units, the percentages by weight based on the total weight of propylene- and ethylene-derived units. The copolymer is substantially free of diene-derived units. In various embodiments, the propylene-ethylene copolymers may have the following characteristics, where ranges from any recited upper limit to any recited lower limit are contemplated: a melting point ranging from an upper limit of less than 110° C., or less than 90° C., or less than 80° C., or less than 70° C., to a lower limit of greater than 25° C., or greater than 35° C., or greater than 40° C., or greater than 45° C.

In one embodiment, the propylene-ethylene copolymer may includes from a lower limit of 5% or 6% or 8% or 10% by weight to an upper limit of 20% or 25% by weight ethylene-derived units, and from a lower limit of 75% or 80% by weight to an upper limit of 95% or 94% or 92% or 90% by weight propylene-derived units, the percentages by weight based on the total weight of propylene- and ethylene-derived units. The propylene-ethylene copolymer is substantially free of diene-derived units. The propylene-ethylene copolymers may have a melting point ranging from an upper limit of less than 110° C., or less than 90° C., or less than 80° C., or less than 70° C., to a lower limit of greater than 25° C., or greater than 35° C., or greater than 40° C., or greater than 45° C.

As will be appreciated, the qualification of materials as "first" and "second" is for sake of convenience. Unless specified, use of those terms should not be construed as excluding other materials. Nor should it be construed as suggesting that any particular sequence of processing steps need be employed. Other ingredients may be employed in addition to the above first and second materials, including but not limited to art disclosed ingredients such as one or more fillers, reinforcements, light stabilizers, colorants, flame retardants, thermal stabilizers, nucleators, or the like.

It is contemplated that two or more of the first, second and optional other materials can be supplied together as a kit, such as in one or more suitable containers. Such kit, as well as its individual component materials is, therefore within the scope of the present invention. By way of example, a kit may include in separate packages (i) a first polyolefin; (ii) at least one particulated mineral filler; and (iii) a second polyolefin having a melt index greater than about 150 g/10 min at 190° C./2.16 kg, as measured per ISO 1133 (condition D). The first polyolefin in the kit preferably includes greater than about 8 weight % (by weight of the first material) of ethylene. The mineral filler in the kit preferably includes talc. The second polyolefin in the kit preferably includes an ethylene-octene copolymer. Suitable kits may include, in a separate package, a polyolefin that is different from the first and the second polyolefin.

Articles made using the present invention will include filler particles, which were initially present in the masterbatch. These filler particles could remain within the polymer of the masterbatch after blending, they could become dispersed in the first polyolefin, or a combination could occur. In one embodiment of the invention, the majority (e.g. at least about 50%, or more preferably, at least about 75%) of the filler particles that were originally in the second material (the masterbatch) reside within the first polyolefin after completion of the step of solidifying the molten blend.

Materials resulting from the teachings herein will have any combination of at least two (and more specifically at least 3, 4 or all) of the following properties; namely, a density from about 0.85 to about 1.25 g/cc, and more specifically from about 0.88 to about 1.10 and still more specifically from about 0.89 to about 1.06; flexural modulus that ranges from about 600 to about 2500 MPa, more specifically about 700 to about 1700 MPa, and still more specifically about 800 to about 1300 MPa; a tensile strength (at yield) of at least about 8 MPa, more specifically at least about 12 MPa, and still more specifically, at least about 16 MPa; failure in a ductile mode (e.g., multi-axial dart impact testing (Instrumented Dart Impact)) of greater than about 60% of samples, and more specifically, approximately 100% of samples (at −40° C., −30° C. or −20° C.); or average shrinkage (e.g., mold direction or cross direction mold shrinkage (after 1 or 24 hours at 23° C., or post shrinkage after 30 minutes at 80° C., or both) of less than about 1.4%, and more specifically, less than about 1.1, and still mores specifically less than about 1.0%.

More specifically, materials resulting from the teachings herein will have any combination of failure in a ductile mode (e.g., multi-axial dart impact testing (Instrumented Dart Impact)) of greater than about 60% of samples, and more specifically, approximately 100% (at −40° C., −30° C. or −20° C.) and notched Izod Impact strength (at −20° C.) of at least about 15 J/m, and more specifically of at least about 20 J/m, and still more specifically of at least 30 J/m; and optionally at least one of the following properties; namely, a density from about 0.85 to about 1.25, and more specifically about 0.88 to about 1.10 g/cc, and still more specifically from about 0.89 to about 1.06 g/cm$^3$; flexural modulus that ranges from about 600 to about 2500 MPa, more specifically about 700 to about 1700 MPa, and still more specifically 800 to about 1300 MPa, about; a tensile strength (at yield) of at least about 8 MPa, more specifically at least about 12 MPa, and still more specifically, at least about 16 MPa; or optionally, shrinkage of less than 1.4%, and more specifically, less than about 1.1%, and still more specifically less than 1.0%.

Unless otherwise stated, "melt flow rate" is determined by ISO 1133 using condition M that prescribes a test temperature of 230° C. and a load of 2.16 kg. This test condition is commonly used for polypropylene, including impact polypropylenes. These values are referred to as "melt flow rate" or "MFR". Unless otherwise stated, "melt index" is determined by ISO 1133 using condition D that prescribes a test temperature of 190° C. and a load of 2.16 kg. This test condition is commonly used for polyethylenes, such as high density polyethylene, low density polyethylene, linear low density polyethylene, very low density polyethylene and polyolefin plastomers. Measurements performed at these values are referred to as "melt index" or "MI". Multiaxial or Instrumented Dart Impact (IDI) Energy measurements are according to ASTM D3763. For illustration purposes, multi-axial dart impact testing (Instrumented Dart Impact) is run on an MTS 810 High Rate instrument using a 2000lb load cell. All specimens are approximately four inch diameter disks that are about 0.125 inch thick. The disks are impacted at about 6.7 meters/second using an approximately 13 mm tip. The outer 0.5 inch is screw-clamped, leaving about 3" of test area. A ductile break (denoted herein by a designation "D") leaves a clean hole punched through the center of the part with plastic drawn up to that hole, and no cracks extending radially out visible to the naked eye. The test is repeated on ten specimens to obtain the percent of failures that are ductile.

Density measurements are per ISO 1183 (method A). Notched Izod Impact measurements are according to ISO 180 (method 1A). Percent crystallinity is measured by differential scanning calorimetry, according to ASTM D3417. A milligram size sample of polymer is sealed into an aluminum DSC pan. The sample is placed into a DSC cell with a 25 cubic centimeter per minute nitrogen purge and cooled to −100 C. A standard thermal history is established for the sample by heating at 10 C/minute to 225° C. The sample is then cooled (at 10° C./minute) to −100° C. and reheated at 10° C./minute to 225° C. The observed heat of fusion for the second scan is recorded ($\Delta H_{observed}$). The observed heat of fusion is related to the degree of crystallinity in weight percent based on the weight of the polypropylene sample by the following equation:

$$\% \text{ Crystallinity} = \frac{\Delta H_{observed}}{\Delta H_{isotacticPP}} \times 100,$$

where the heat of fusion for isotactic polypropylene as reported in B. Wunderlich, Macromolecular Physics, Volume 3, Crystal Melting, Academic Press, New York, 1980, p. 48, is 165 Joules per gram of polymer.

Glass transition temperature ($T_g$) is measured by compression molding elastomer samples and performing a temperature ramp using a Rheometrics Dynamic Mechanical Spectrometer. The glass transition temperature is defined as the temperature at the tan delta peak. Solid State Testing is done under liquid nitrogen environment, with torsion fixtures, in dynamic mode. A temperature ramp rate of 3° C./min is used, with a frequency of 1 rad/sec, and an initial strain of 0.1%. Average sample dimensions have a length of 45.0 mm, width of 12.6 mm, and thickness of 3.2 mm.

Unless otherwise noted, flexural modulus is measured by ISO 178. Tensile strength (at yield) is measured by ISO 527-1/2. Shrinkage is measured by ISO 294 using 150 mm×150 mm×3 mm plaques. Brookfield viscosity is measured by ISO 2555.

Figure 1B:
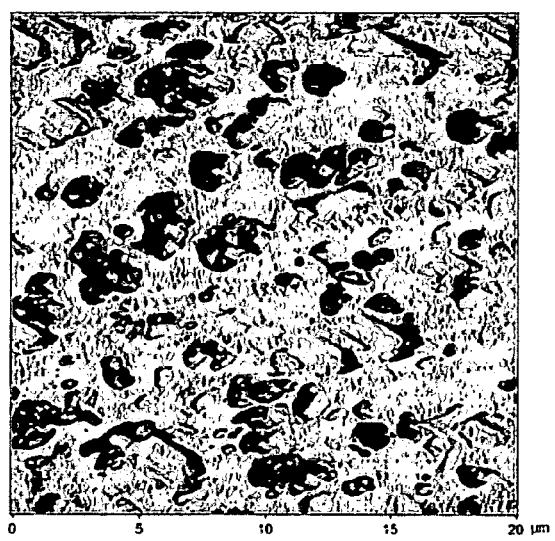

With particular reference to FIG. 1, the materials resulting from the present teachings generally will exhibit a plurality of rubber particles dispersed in a matrix of polyolefin. The volume weighted mean diameter of the particles will range from about 0.5 to about 5 microns, and more specifically will range from about 1 to about 3 microns. The filler is contemplated to be distributed throughout the material, being present in the matrix, the rubber particles, at an interface between the matrix and the rubber particles, or any combination thereof. It is further contemplated that at least about 20% by volume (and more specifically at least about 35% by volume) of the rubber particles will have a diameter within the range of about 1 to 3 microns (e.g., within the range of about 1.5 to about 2.7 microns). Lamellar morphologies are contemplated also.

Atomic force microscopy (AFM) or transmission electron microscopy (TEM) with image analysis may be used for rubber domain size analysis. For example, AFM can be used to generate images of the rubber morphology, sampling an injection molded bar, viewing the core of the bar along the direction of flow. For example, sampling may be performed using a cryo-ultramicrotome (eg. Leica Ultracut S/FCS) at a temperature below the glass transition temperature of the polymers (e.g. −100° C.). AFM images may be obtained using a Tapping Mode™ (trademark of Veeco Instruments, Inc., Santa Barbara, Calif.) where the cantilever is oscillated at a resonant frequency and the feedback control adjusts for constant tapping amplitude. Images were processed using Veeco Instruments Nanoscope software version 5.12b46. Image analysis can be performed using Leica Qwin software to obtain average particle size and particle size distributions. This software did not use plane section correction of the particle size distribution. Such a correction may be used and would result in a larger particle size distribution.

The articles in accordance with the present invention find use in a number of applications. Among them, are applications in which polyolefinic materials, and particularly thermoplastic polyolefins, are employed. For example, the materials made according to the teachings herein find attractive application in transportation vehicles as an interior or exterior component, such as bumpers, fascias, exterior trim, grilles, side skirts, spoilers, air dams, cladding, interior trim panels, knee bolsters, instrument panels, handles, or the like. The articles may be shaped and will consist essentially of the materials according to the teachings herein. They may be part of an assembly as well. It is possible for example that a shaped article made according to the teachings herein is laminated to another structure, such as by weld, adhesive bond, fastener or any combination thereof. It is also possible that articles may be part of an overmolded or co-injection molded assembly.

Examples of bonding agent systems suitable for use herein include, without limitation, cyanacrylates, (meth) acrylics, polyurethanes, silicones, epoxies, or the like. One particularly attractive adhesive includes an organoborane/amine complex, such as disclosed in U.S. Pat. Nos. 6,710,145; 6,713,579; 6,713,578; 6,730,759; 6,949,603; 6,806,330; and Published U.S. Application Nos. 2005-0004332 and 2005-0137370; all of which are hereby expressly incorporated by reference.

The articles may be suitably treated in a secondary operation as well for improving their properties. By way of example, without limitation, they may be coated or otherwise surface treated. For example, in one embodiment, the surfaces of a body can optionally undergo a preliminary treatment prior to attachment to another body. This optional treatment can include cleaning and degreasing, plasma coating, corona discharge treating, coating with another surface treatment, coated with a bonding agent, or any combination thereof. In one embodiment, a body may be subject to a carbon-silica based plasma deposited coating, e.g., as described in U.S. Pat. No. 5,298,587; U.S. Pat. No. 5,320,875; U.S. Pat. No. 5,433, 786 and U.S. Pat. No. 5,494,712, all hereby incorporated herein by reference. Other surface treatments might also be employed such as plasma surface treatment pursuant to art disclosed teachings as found in U.S. Pat. No. 5,837,958, incorporated herein by reference. In-mold decoration may also be employed.

The following examples illustrate various aspects of the present invention. The values shown are approximate and should not be regarded as limiting of the inventions. Variations in the processing parameters are possible as disclosed throughout the specification. In addition, the results shown may vary as well (e.g., by +/−10% of the stated values or even higher).

EXAMPLES

Table 1 lists some polyolefins that may be used in the second material for compounding with the filler. Affinity GA1900 and Affinity GA1950 are examples of polyolefin plastomers that may be used. Other like materials may be used, for example there may be employed ethylene-octene plastomers that have a density of about 0.87 and also have a low viscosity as measured by Brookfield viscosity @ 177° C. of 8,000 to 17,000 cps. The melt index of Affinity GA1900 and Affinity GA1950 is approximately 1000 and 500 g/10 min, respectively (measured using ISO 1133 condition D: 190° C./2.16 kg). Versify DE4300.01 is a developmental elastomer produced from Dow Plastics and is a polypropylene-ethylene copolymer. Versify DE4300.01 has a typical melt flow rate of about 25.

Samples of masterbatch with talc and Affinity GA1900 are made on a ZSK-25 twin screw extruder at screw speeds of 200 to 450 rpm as shown in Table 2. The concentration of talc for these samples is from 40 wt. % up to 80 wt. %. Additional masterbatch samples are given in Table 3, where either Affinity GA1900 or Versify DE4300.01 is compounded with the talc.

One polyolefin that can be used as the first material is an impact polypropylene. Table 4 lists five illustrative impact polypropylenes available from Dow Plastics, DC7003, XUR-258, D143.00 Developmental TPO, C705-44NA, and C715-12NHP. These polypropylenes all contain a high stiffness phase corresponding to polypropylene homopolymer and a soft phase corresponding to an elastomeric ethylene copolymer.

The impact polypropylene is fed into the hopper of an injection molding machine along with either MB8 or MB9. Prior to feeding into the injection molding machine, the impact polypropylene and the masterbatch are dry blended by hand. The compositions of these samples are given in Table 5. Control sample 1 contains only the polypropylene DC7003. Examples 2, 3, and 4 contain 6%, 8% and 10% MB8 respectively and 94%, 92%, and 90% polypropylene DC7003 respectively. Example 5 contains 8% MB9 and 92% polypropylene DC7003. These samples are all prepared with no melt blending of the impact polypropylene and the masterbatch prior to feeding into the injection molding machine. The machine used for the injection molding is a Demag/Ergotech 80-200 having a 25 mm diameter screw and a length to diameter ratio (L/D) of about 20. The screw is a standard screw for molding of impact polypropylenes and has no mixing sections. The compression ratio of the screw ranged from 2 to 3. The test samples are molded using inserts either for 3 mm plaques or for tensile and flex bars. The process conditions for this injection molding machine as well as other machines using the process as taught elsewhere herein, include:

Barrel Temperatures (from nozzle to feedthroat):
  190-230° C. (e.g. 210)
  190-230° C. (e.g. 210)
  170-210° C. (e.g. 190)
  150-190° C. (e.g. 170)
  40-95° C. (e.g. 70)

Tool Temperature: 35-50° C./35-50° C. (e.g. 40° C./40° C.)

Dosing Speed: 150-190 rpm (e.g. 170 rpm)

Back Pressure: 40-100 bar (e.g. 70 bar)

Dosing Stroke: 70-80 mm (e.g. 74.5 mm)

Screw Back: 73-83 mm (e.g. 77.5 mm) (decompression of about 3 mm)

Switchover Point: 8-12 mm (e.g. 10 mm)

Holding Pressure: 450-550 bar (e.g. 491 bar) for tensile bars
  300-400 bar (e.g. 350 bar) for 3 mm plaques Holding Time: 30-50 sec (e.g. 40 sec)

Injection Speed: 25-50 mm/sec (e.g. 35 mm/sec)

Cooling time: 10-20 sec (e.g. 13 sec)

Total Cycle time: +/−60 sec (according to ISO standard)

Control sample C6 is prepared by injection molding polypropylene XUR-258 alone. Examples 7-16 are prepared by injection molding polypropylene XUR-258 with MB4 or MB5 according to the concentrations shown in Table 6. There is no melt blending of polypropylene XUR-258 with MB4 or MB5 prior to feeding into the hopper of the injection molding machine.

AFM micrographs of Ex. 4 are shown in FIG. 1. These micrographs show the continuous phase being the stiffer polypropylene and discrete particles of a softer phase (dark particles) that includes the elastomeric polymer from the impact polypropylene and the Affinity GA1900, which appear to be compatible. The light particles of the talc can also be observed in this AFM micrograph. The average fraction particle size of the soft particles is about 1.65 μm. This phase represents about 28% of the total material.

The AFM micrographs of FIG. 1 also show that after the material is injection molded, the majority of the talc particles could possibly reside in the polypropylene phase of the injection molded part.

TABLE 1

Typical Properties of Polyolefins Used in the Masterbatch Material

| Composition (wt. %) | Affinity GA1900 | Affinity GA1950 | Versify DE4300.01 |
|---|---|---|---|
| Primary monomer | Ethylene | Ethylene | Propylene |
| Melt Index, ISO 1133 Condition D, g/10 min | 1000 | 500 | 25 |
| Density, g/cm$^3$ | 0.870 | 0.874 | 0.866 |
| Glass Transition Temperature, ° C. | −58 | −57 | −29 |
| DSC Melting Temperature, ° C. | 68 | 70 | |
| Tensile Strength, MPa (ASTM D638) | 1.55 | 1.76 | |
| Ultimate Elongation, % (ASTM D638) | 106 | 185 | |
| Tensile Strength at Yield, MPa (ASTM D638) | | | 2.8 |
| Ultimate Elongation at Yield, % (ASTM D638) | | | 67 |
| Flexural Modulus, MPa (ASTM D-790A) | | | 32 |
| Brookfield Viscosity (177° C.), cps | 8200 | 17000 | |

TABLE 2

Compositions of Masterbatch Samples

| | MB1 | MB2 | MB3 | MB4 | MB5 | MB6 | MB7 |
|---|---|---|---|---|---|---|---|
| Talc, Mistron G7C | 40.00 | 50.00 | 60.00 | 65.00 | 70.00 | 75.00 | 80.00 |
| Affinity GA1900 | 51.43 | 42.86 | 34.29 | 30.00 | 25.71 | 21.43 | 17.14 |
| Erucamide | 3.43 | 2.86 | 2.29 | 2.00 | 1.71 | 1.43 | 1.14 |
| UV Stabilizers | 5.14 | 4.29 | 3.43 | 3.00 | 2.57 | 2.14 | 1.71 |
| Specific Energy, J/g | 392 | 551 | 1192 | 1156 | 1337 | 1590 | 3097 |

TABLE 2-continued

Compositions of Masterbatch Samples

|  | MB1 | MB2 | MB3 | MB4 | MB5 | MB6 | MB7 |
|---|---|---|---|---|---|---|---|
| Melt Temperature, °C. | 100 | 104 | 106 | 106 | 112 | 130 | 174 |
| Screw speed, rpm | 200 | 300 | 350 | 350 | 350 | 350 | 450 |

TABLE 3

Compositions of Masterbatch Samples

|  | MB8 | MB9 | MB10 | MB11 |
|---|---|---|---|---|
| (a) Mistron Talc G7C | 70 | 70 | 65 | 60 |
| Affinity GA1900 | 30 |  |  |  |
| Versify DE4300.01 |  | 30 | 35 | 40 |
| Specific Energy, J/g |  | 1997 | 1864 | 1820 |

TABLE 4

Properties of Polypropylene Materials

| Polypropylene Grade | DC7003 | XUR-258 | D143.00 Developmental | C705-44NA | C715-12NHP |
|---|---|---|---|---|---|
| Melt Flow Rate, g/10 min | 12 |  | 11 | 44 | 12 |
| Ethylene Concentration, wt. % | 16.5 | 15 | 15 | 8 | 8 |
| Density | 0.90 | 0.9 | 0.90 | 0.9 | 0.9 |
| Flexural Modulus, MPa | 710 | 840 | 950 | 1450 | 1450 |
| Tensile Strength (Yield), MPa | 17.1 | 18 | 18 | 28 | 28 |
| Polypropylene type | Impact | Impact | Impact | Impact | Impact |

TABLE 5

Compositions and Properties of Injection Molded Blends

|  | C-1 | Ex. 2 | Ex. 3 | Ex. 4 | Ex. 5 |
|---|---|---|---|---|---|
| Composition (wt. %) |  |  |  |  |  |
| Polypropylene DC7003 | 100% | 94% | 92% | 90% | 92% |
| MB8 |  | 6% | 8% | 10% |  |
| MB9 |  |  |  |  | 8% |
| Total | 100% | 100% | 100% | 100% | 100% |
| Properties |  |  |  |  |  |
| Melt Index, g/10 min, (230° C.) | 10 | 11.6 | 13.3 | 12.9 | 12.5 |
| Flex Modulus, MPa | 714 | 939 | 1040 | 1100 | 1023 |
| Dart Impact, (−40° C. 2 mm, total energy), J |  | 49.5 | 53.6 | 51.2 | 53.6 |
| Dart Impact, (−20° C., 3 mm, total energy), J | 31.0 | 42.6 | 52.7 | 53.1 | 53.7 |
| Charpy Impact, (notch, 23° C.), kJ/m² | 62.0 | 67.3 | 65.8 | 65.4 | 67.0 |
| Charpy Impact, (notch, −20° C.), kJ/m² | 11.2 | 12.1 | 12.3 | 11.4 | 11.3 |

TABLE 6

Compositions of Injection Molded Blends and Properties

|  | C-6 | Ex. 7 | Ex. 8 | Ex. 9 | Ex. 10 | Ex. 11 |
|---|---|---|---|---|---|---|
| Composition (wt. %) |  |  |  |  |  |  |
| Polypropylene XUR-258 | 100% | 91.5% | 87.7% | 84.6% | 81.5% | 72.3 |
| MB4 (65% talc) |  | 8.5% | 12.3% | 15.4% | 18.5% |  |
| MB5 (70% talc) |  |  |  |  |  | 27.7% |
| Total | 100% | 100% | 100% | 100% | 100% | 100% |
| Talc concentration-calculated | 0% | 5.5% | 8.0% | 10.0% | 12.0% | 18.0% |
| Properties |  |  |  |  |  |  |
| Density, g/cm³ | 0.897 | 0.929 | 0.947 | 0.96 | 0.971 | 1.039 |
| Flexural Modulus, MPa | 837 | 1090 | 1205 | 1283 | 1274 | 1440 |
| Tensile Strength at Yield, MPa | 17.9 | 18 | 17.5 | 17.8 | 17.5 | 16.8 |
| Elongation at Yield, % | 7.7 | 6.7 | 6.7 | 6.4 | 6.5 | 6.3 |
| Notched Izod (23° C.), kJ/m² | 46.5 | 47.4 | 49.3 | 44.2 | 43.2 | 40.1 |
| Notched Izod (0° C.), kJ/m² | 49.6 | 46.8 | 43.1 | 41.1 | 41.9 | 33.3 |
| Notched Izod (−20° C.), kJ/m² | 41.3 | 39.9 | 33.5 | 34.4 | 33.3 | 23 |
| Notched Izod (−30° C.), kJ/m² | 15.3 | 33.6 | 29.1 | 16.5 | 6.9 | 6.8 |
| Notched Izod (−40° C.), kJ/m² | 10.6 | 8.9 | 9.6 | 8.5 | 6.7 | 5.9 |
| Falling Dart Impact at −20° C. |  |  |  |  |  |  |
| Energy at peak, J | 26.9 | 26.3 | 26.3 | 25 | 24.4 | 23.6 |
| Total Energy, J | 51.5 | 51.8 | 51.3 | 50.5 | 49.5 | 49.2 |
| Failure Type, % Ductile | 100 | 100 | 100 | 100 | 100 | 90 |

TABLE 6-continued

Compositions of Injection Molded Blends and Properties

| | | | | | | |
|---|---|---|---|---|---|---|
| Falling Dart Impact at −30° C. | | | | | | |
| Energy at peak, J | 27.8 | 29.5 | 29.5 | 26 | 25.9 | 25.2 |
| Total Energy, J | 54.8 | 58 | 58.2 | 53 | 51.9 | 49.5 |
| Failure Type, % Ductile | 100 | 100 | 100 | 100 | 100 | 60 |
| Falling Dart Impact at −40° C. | | | | | | |
| Energy at peak, J | 32.6 | 28.9 | 28.3 | 29.3 | 29 | 28.9 |
| Total Energy, J | 63.3 | 57.3 | 55.7 | 56.1 | 54.4 | 43.2 |
| Failure Type, % Ductile | 100 | 100 | 70 | 40 | 0 | 0 |
| Shrinkage of 150 × 150 × 3 mm injection molded plaque | | | | | | |
| Mold direction, after 1 h, % | 1.22 | 1.05 | 1.00 | 0.97 | 0.88 | 0.77 |
| Cross direction, after 1 h, % | 1.20 | 1.06 | 0.98 | 0.97 | 0.92 | 0.84 |
| Mold direction, after 24 h, % | 1.28 | 1.12 | 1.04 | 1.04 | 0.96 | 0.81 |
| Cross direction, after24 h, % | 1.24 | 1.10 | 1.01 | 1.01 | 0.97 | 0.89 |
| Mold direction, 30 min/80° C., % | 1.39 | 1.04 | 1.05 | 1.03 | 0.94 | 0.81 |
| Cross direction, 30 min/80° C., % | 1.36 | 1.11 | 1.06 | 1.05 | 1.00 | 0.91 |

| | Ex. 12 | Ex. 13 | Ex. 14 | Ex. 15 | Ex. 16 |
|---|---|---|---|---|---|
| Composition (wt. %) | | | | | |
| Polypropylene XUR-258 | 92.1% | 88.6% | 85.7% | 82.9 | 74.3 |
| MB4 (65% talc) | | | | | |
| MB5 (70% talc) | 7.9% | 11.4% | 14.3% | 17.1 | 25.7% |
| Total | 100% | 100% | 100% | 100% | 100% |
| Talc concentration-calculated | 5.5% | 8.0% | 10.0% | 12.0% | 18.0% |
| Properties | | | | | |
| Density, g/cm³ | 0.924 | 0.94 | 0.963 | 0.968 | 1.017 |
| Flexural Modulus, MPa | 1035 | 1165 | 1199 | 1305 | 1443 |
| Tensile Strength at Yield, MPa | 18 | 18.1 | 17.7 | 18 | 17.5 |
| Elongation at Yield (%) | 6.4 | 6.1 | 6.7 | 6.2 | 6 |
| Notched Izod (23° C.), kJ/m² | 46.9 | 50.8 | 47.2 | 46.7 | 42.9 |
| Notched Izod (0° C.), kJ/m² | 48.5 | 46.7 | 42.6 | 40.4 | 35 |
| Notched Izod (−20° C.), kJ/m² | 39.6 | 37 | 31.7 | 31 | 16.9 |
| Notched Izod (−30° C.), kJ/m² | 13.2 | 28.1 | 26.5 | 17.6 | 8 |
| Notched Izod (−40° C.), kJ/m² | 8.8 | 9 | 8.8 | 8.6 | 6.3 |
| Falling Dart Impact at −20° C. | | | | | |
| Energy at peak, J | 26.9 | 26.6 | 26.8 | 26.9 | 25.7 |
| Total Energy, J | 52.4 | 51.8 | 50.9 | 52.5 | 50 |
| Failure Type, % Ductile | 100 | 100 | 90 | 100 | 70 |
| Falling Dart Impact at −30° C. | | | | | |
| Energy at peak, J | 27.2 | 25.9 | 27.8 | 29.5 | 27.7 |
| Total Energy, J | 52.9 | 46.4 | 54.7 | 52 | 42.4 |
| Failure Type, % Ductile | 100 | 80 | 100 | 20 | 0 |
| Falling Dart Impact at −40° C. | | | | | |
| Energy at peak, J | 31.9 | 30.9 | 31.7 | 28.3 | 28.7 |
| Total Energy, J | 57.3 | 46 | 53.9 | 50.2 | 47.1 |
| Failure Type, % Ductile | 50 | 10 | 0 | 10 | 0 |
| Shrinkage of 150 × 150 × 3 mm injection molded plaque | | | | | |
| Mold direction, after 1 h, % | 1.09 | 1.04 | 0.97 | 0.90 | 0.85 |
| Cross direction, after 1 h, % | 1.06 | 1.03 | 0.96 | 0.92 | 0.88 |
| Mold direction, after 24 h, % | 1.18 | 1.12 | 1.06 | 0.95 | 0.90 |
| Cross direction, after 24 h, % | 1.14 | 1.09 | 1.05 | 0.97 | 0.93 |
| Mold direction, 30 min/80° C., % | 1.16 | 1.11 | 1.05 | 0.95 | 0.90 |
| Cross direction, 30 min/80° C., % | 1.15 | 1.10 | 1.06 | 1.00 | 0.95 |

As discussed previously, desirably, the process of the present invention is substantially free of a step of compounding together the first, second and any third or other materials prior to the blending step, and specifically a compounding step that includes a melt blending step of the materials. It will be appreciated that such requirement can still be met by employing dry blend steps below the melting points of the materials. For example, it is possible that prior to introduction of the starting materials into a screw and barrel assembly herein, pellets of the materials may be dry mixed (e.g., by a mixing arm in a hopper). A suitable feeder, such as a gravimetric feeder (as discussed) may optionally be employed.

As can be seen, the teachings herein permit for the production of shaped thermoplastic articles that feature comparable or better performance characteristics relative to existing materials that are compounded prior to their introduction into a shaping apparatus (e.g., prior to introduction to a hopper of an injection molding machine). Advantageously, the materials are processed into resulting articles with a heat history that is substantially minimized as compared with articles made with previously compounded blends.

While a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute processes in accordance with the present invention.

Unless stated otherwise, dimensions and geometries of the various embodiments depicted herein are not intended to be restrictive of the invention, and other dimensions or geometries are possible. Plural structural components or steps can be provided by a single integrated structure or step. Alternatively, a single integrated structure step might be divided into separate plural components or steps. However, it is also possible that the functions are integrated into a single component or step. Moreover, the disclosure of "a" or "one" element or step is not intended to foreclose additional elements or steps.

The use of "about" or "approximately" in connection with a range applies to both ends of the range. Thus, "about 20 to 30" is intended to cover "about 20 to about 30", inclusive of at least the specified endpoints.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A kit for use in an injection molding process wherein the kit includes in separate packages:
   a first polyolefin;
   (ii) at least one particulated mineral filler, wherein the mineral filler includes talc; and
   (iii) a second polyolefin having a melt index greater than 150 g/10 min at 190° C./2.16 kg, as measured per ISO 1133 (condition D).

2. A kit for use in a process for making a shaped article, wherein the kit includes in separate packages:
   (a) a first material including a first polyolefin; and
   (b) a second material including an admixture including
      (i) from about 45 to 85 weight percent of at least one particulated mineral filler, based on the total weight of the admixture, and
      (ii) from about 15 to about 55 weight percent of a second polyolefin, wherein the second polyolefin comprises a polyolefin plastomer that includes a thermoplastic having a primary monomer of ethylene, a comonomer selected from the group consisting of 1-butene, 1-hexene, and 1-octene, and is characterized by a melt index greater than 150 g/10 min at 190° C./2.16 kg, as measured per ISO 1133 condition D.

3. The kit of claim 2, wherein the first polyolefin of the first material comprises a thermoplastic polyolefin, the first material and second materials are pellets, the polyolefin plastomer includes a polymer made with a metallocene catalyst; and the second material further comprises a propylene-ethylene copolymer characterized by
   i) a melt index greater than 10 g/10 min at 230° C./2.16 kg as measured per ISO 1133, and
   ii) a flexural modulus of less than 100 MPa, as measured per ASTM D-790A.

4. The kit of claim 3, wherein the propylene-ethylene copolymer is characterized by:
   i) from 6% by weight to 25% by weight ethylene-derived units, and from 75% by weight to 94% by weight propylene-derived units, the percentages by weight based on the total weight of propylene- and ethylene-derived units, and
   ii) a melting point ranging from 35° C. to 110° C.

5. The kit of claim 2, wherein the thermoplastic polyolefin of the first material includes a polypropylene impact copolymer characterized by a melt flow rate of less than 70 g/10 min as measured according to ISO 1133 condition M at 230° C./2.16 kg, containing greater than 8 weight percent of ethylene, and having greater than 40 weight percent crystallinity.

6. The kit of claim 2, wherein the kit further comprises includes at least one additive selected from a heat stabilizer, a UV stabilizer, a mold release agent, a nucleator, a lubricant, a slip agent, a colorant or any combination thereof.

7. The kit of claim 2, wherein the second polyolefin includes an ethylene-octene copolymer.

8. The kit of claim 2, wherein the particulated mineral filler includes talc.

9. The kit of claim 2, wherein particles of the second material are coated or partially coated with a mineral filler or a micronized polymer.

10. A kit for use in a process for making a shaped article, wherein the kit includes:
    (a) a first material including a first polyolefin; and
    (b) a second material including an admixture including
       (i) from about 45 to 85 weight percent of at least one particulated mineral filler, based on the total weight of the admixture, wherein the particulated mineral filler includes talc, and
       (ii) from about 15 to about 55 weight percent of a second polyolefin, wherein the second polyolefin comprises a polyolefin plastomer that includes a thermoplastic having a primary monomer of ethylene, a comonomer selected from the group consisting of 1-butene, 1-hexene, and 1-octene, and is characterized by a melt index greater than 150 g/10 min at 190° C./2.16 kg, as measured per ISO 1133 condition D.

11. The kit of claim 10, wherein the first polyolefin of the first material comprises a thermoplastic polyolefin, the first material and second materials are pellets, the polyolefin plastomer includes a polymer made with a metallocene catalyst; and the second material further comprises a propylene-ethylene copolymer characterized by
    i) a melt index greater than 10 g/10 min at 230° C./2.16 kg as measured per ISO 1133, and
    ii) a flexural modulus of less than 100 MPa, as measured per ASTM D-790A.

12. The kit of claim 10, wherein the propylene-ethylene copolymer is characterized by:
   i) from 6% by weight to 25% by weight ethylene-derived units, and from 75% by weight to 94% by weight propylene-derived units, the percentages by weight based on the total weight of propylene- and ethylene-derived units, and
   ii) a melting point ranging from 35° C. to 110° C.

13. The kit of claim 10, wherein the thermoplastic polyolefin of the first material includes a polypropylene impact copolymer characterized by a melt flow rate of less than 70 g/10 min as measured according to ISO 1133 condition M at 230° C./2.16 kg, containing greater than 8 weight percent of ethylene, and having greater than 30 weight percent crystallinity.

14. The kit of claim 10, wherein the kit includes a container for the first material and a container for the second material.

15. The kit of claim 14, wherein the first polyolefin of the first material comprises a thermoplastic polyolefin, the first material and second materials are pellets, the polyolefin plastomer includes a polymer made with a metallocene catalyst; and the second material further comprises a propylene-ethylene copolymer characterized by
   i) a melt index greater than 10 g/10 min at 230° C./2.16 kg as measured per ISO 1133, and
   ii) a flexural modulus of less than 100 MPa, as measured per ASTM D-790A.

16. The kit of claim 14, wherein the propylene-ethylene copolymer is characterized by:
   i) from 6% by weight to 25% by weight ethylene-derived units, and from 75% by weight to 94% by weight propylene-derived units, the percentages by weight based on the total weight of propylene- and ethylene-derived units, and
   ii) a melting point ranging from 35° C. to 110° C.

17. The kit of claim 14, wherein the thermoplastic polyolefin of the first material includes a polypropylene impact copolymer characterized by a melt flow rate of less than 70 g/10 min as measured according to ISO 1133 condition M at 230° C./2.16 kg, containing greater than 8 weight percent of ethylene, and having greater than 30 weight percent crystallinity.

18. The kit of claim 14, wherein the kit further comprises includes at least one additive selected from a heat stabilizer; a UV stabilizer, a mold release agent, a nucleator, a lubricant, a slip agent, a colorant or any combination thereof.

19. The kit of claim 14, wherein the second polyolefin includes an ethylene-octene copolymer.

20. The kit of claim 14, wherein particles of the second material are coated or partially coated with a mineral filler or a micronized polymer.

* * * * *